(No Model.)
A. LOW.
Harrow.
No. 227,551. Patented May 11, 1880.
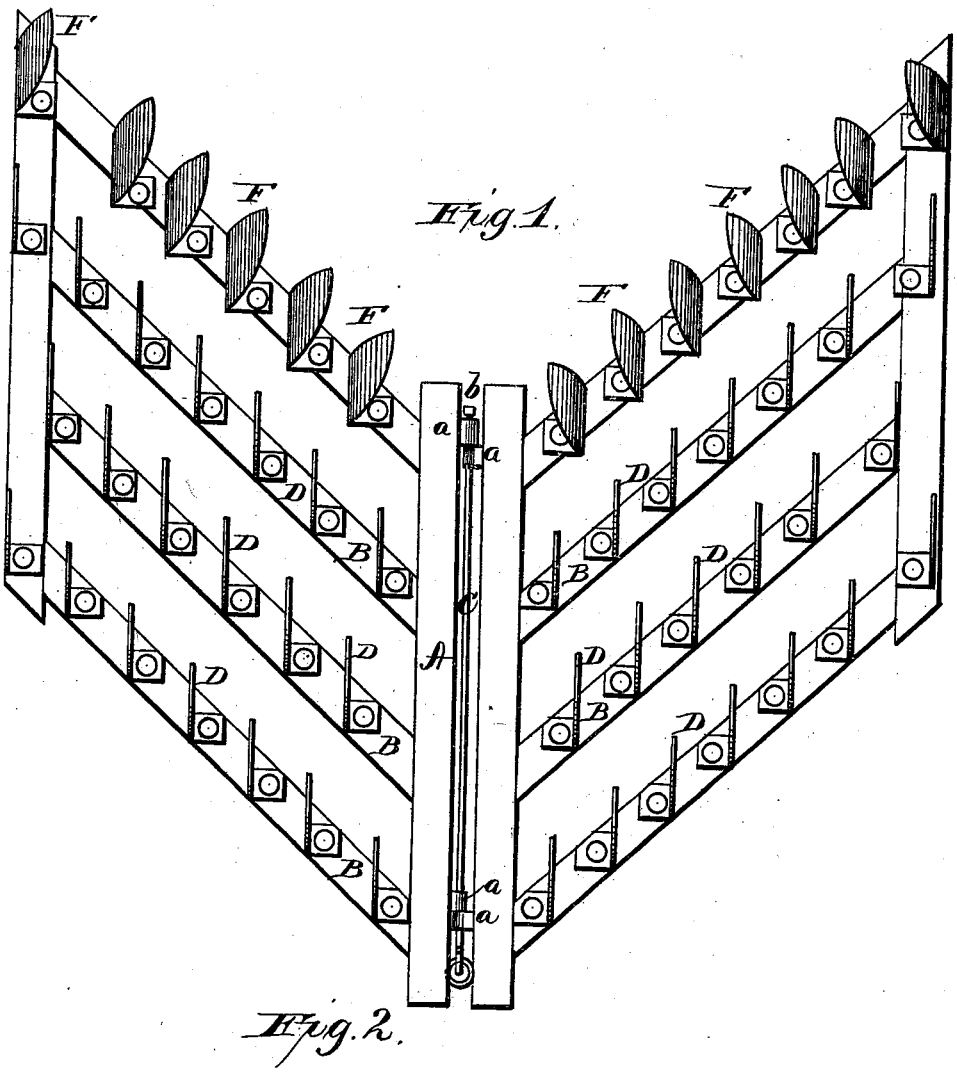
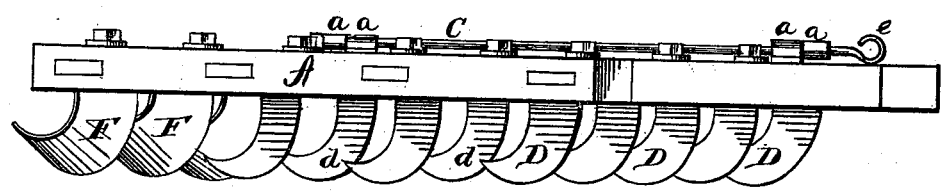
Witnesses:
Franck L. Durand
J. J. McCarthy
Inventor:
Addison Low
By Alexander Mason
atty

UNITED STATES PATENT OFFICE.

ADDISON LOW, OF OHLMAN, ILLINOIS.

HARROW.

SPECIFICATION forming part of Letters Patent No. 227,551, dated May 11, 1880.

Application filed April 12, 1880. (No model.)

*To all whom it may concern:*

Be it known that I, ADDISON LOW, of Ohlman, in the county of Montgomery, and in the State of Illinois, have invented certain new and useful Improvements in Harrows; and I do hereby declare that the following is a full, clear, and exact description thereof, reference being had to the accompanying drawings, and to the letters of reference marked thereon, making a part of this specification.

The nature of my invention consists in the construction and arrangement of a harrow and cultivator, as will be hereinafter more fully set forth.

In order to enable others skilled in the art to which my invention appertains to make and use the same, I will now proceed to describe its construction and operation, referring to the annexed drawings, in which—

Figure 1 is a bottom view, and Fig. 2 a side view, of my harrow. Fig. 3 is a detailed section of a part thereof.

My harrow is composed of two separate and independent diamond-shaped frames or sections, each frame or section consisting of two parallel side bars, A A, and four (more or less) inclined parallel cross-bars, B. The sections are connected by means of a central rod, C, passing through strap-hinges $a$ $a$, fastened on top of the sections, and so arranged that the harrow can easily be folded, one section on top of the other. On the rear end of the rod C is placed a nut, $b$, while the forward end of the rod forms a hook, $e$, to which the team is to be attached.

It will thus be seen that the draft is actually applied at the rear of the harrow, which renders it much easier for the team.

Each section of the harrow is provided with three rows of teeth, D, set upon the three front cross-bars, and one tooth on the outer side bar near the front end. These teeth are made of steel, flat and curved rearward, terminating in a point, $d$.

On the rear cross-bar of each section is a series of curved mold-boards, F, which turn the soil after it has been pulverized by the teeth D. A similar mold-board is attached to the inner side bar of each section.

The mold-boards or turning-blades F are made substantially of the same form as the teeth D, and are then bent or curled toward one side, as shown, to turn and lay the earth evenly after the same is cut by the preceding knives.

The teeth D and mold-boards F are all formed at their upper ends with a side flange, $h$, which is placed against the under side of the frame, and a bolt, $i$, then passed through, as shown in Fig. 3, secures the parts firmly together.

The harrow thus constructed will thoroughly pulverize and turn the soil in the best possible manner. In cultivating corn the inner mold-boards F will be removed.

I am aware that mold-boards have been used in harrows in combination with teeth or knives, and I do not, therefore, claim such, broadly, as my invention.

By making the frames or sections smaller and connecting them rigidly together, by handles or otherwise, and arranging the teeth and mold-boards suitable distances apart, a perfect cultivator is obtained.

Having thus fully described my invention, what I claim as new, and desire to secure by Letters Patent, is—

1. In a harrow, the turning-blades F, formed and bent as shown, and adapted to evenly turn and lay the earth cut by the front teeth or knives, substantially as herein set forth.

2. The blades F, constructed as described, in combination with the diamond-shaped sections and series of curved cutting-knives D, alternately arranged, substantially as and for the purposes herein set forth.

In testimony that I claim the foregoing I have hereunto set my hand this 2d day of April, 1880.

ADDISON LOW.

Witnesses:
H. AUBREY TOULMIN,
WM. A. DAVIDSON.